Oct. 11, 1966  SHOTARO TOMINAGA  3,278,712
METAL-CLAD COMPRESSED-FLUID SWITCHGEAR CONSTRUCTIONS
AND FLUID COUPLINGS THEREFOR
Filed Dec. 30, 1963  3 Sheets-Sheet 1

WITNESSES
Theodore F. Wrobel
James F. Young

INVENTOR
Shotaro Tominaga
BY
Willard R. Crout
ATTORNEY

United States Patent Office 3,278,712
Patented Oct. 11, 1966

3,278,712
METAL-CLAD COMPRESSED-FLUID SWITCH-
GEAR CONSTRUCTIONS AND FLUID COU-
PLINGS THEREFOR
Shotaro Tominaga, Amagasaki, Hyogo-ken, Japan, assignor to Mitsubishi Denki Kabushiki Kaisha, Tokyo, Japan, a company of Japan
Filed Dec. 30, 1963, Ser. No. 334,395
Claims priority, application Japan, Mar. 20, 1963, 38/14,875
8 Claims. (Cl. 200—148)

This invention relates, in general, to metal-clad compressed-fluid switchgear constructions and to quick connect-disconnect fluid couplings therefor, and, more particularly, to fluid couplings for use in introducing an arc-extinguishing fluid and/or operating fluid into metal-clad compressed-gas switchgear having removable circuit-breaker units say, for example, of the truck-mounted type.

Although not necessarily limited thereto, the present invention is particularly adapted for use with truck-mounted metal-clad switchgear units, in which a compressed-fluid circuit breaker, or the like, may be mechanically moved between a test or disconnected position and an operating position, in which latter position it is connected to the power circuit in which it is to be used. Such compressed-fluid circuit breakers may be encased within a metal housing adapted for cubicle construction and used with an arc-extinguishing or arc-suppressing fluid. Such fluid may also serve as the operating fluid for a pneumatic operator.

According to prior-art practice, in certain switchgear of this type, the gas-filled enclosure housing the circuit breaker must be disconnected from gas piping when it is moved from operating to test positions, and then connected to the piping in the reverse operation, when moved from test to operating positions. In the past, this has usually been accomplished either by manually manipulating a pneumatic coupling, or by manually closing and opening a valve provided in the gas piping. In either case, extreme care must be taken to prevent the gas from escaping during the connecting or disconnecting procedure.

Since, in many cases, the gas piping is disposed at the back of the switchgear assembly where it is not easily accessible, the foregoing prior-art procedure is not only inconvenient and cumbersome, but also necessitates a rather large space behind the apparatus sufficient to permit the connecting and disconnecting operations to be performed.

As one object, therefore, the present invention seeks to provide apparatus for eliminating the necessity for manually connecting and disconnecting fluid couplings on truck-mounted metal-clad switchgear units movable between test and operating positions within a cell or cubicle.

Another object of the invention is to provide means whereby the enclosure of metal-clad compressed-gas switchgear will be automatically connected to gas piping when moved from test to operating positions, and including an automatically-operated valve arranged to be closed upon movement of the switchgear unit from operating to test positions to prevent the escape of gas from a source of arc-extinguishing fluid under pressure.

A further and more general object of the invention is to provide a quick connect-disconnect fluid coupling which automatically prevents the escape of gas when the male and female elements of the coupling are separated.

In accordance with one aspect of the invention, a metal-clad compressed-fluid type of circuit breaker is provided, which is movable between operating and test positions relative to the cell, the circuit breaker mechanism including a circuit interrupter and a fluid reservoir adapted to receive an arc-extinguishing fluid, which, in addition, may be used as the operating fluid. Connected to aforesaid structure is a first conduit having a coupling element thereon and movable with the circuit-breaker unit between operating and test positions. This coupling element is adapted to engage an associated coupling element on a second, stationary conduit adapted for connection to a source of arc-extinguishing fluid under pressure associated with the cell structure, and positioned such that upon movement of the circuit-breaker unit from its test to operating positions, the two coupling elements will be automatically connected to thereby connect the source of arc-extinguishing fluid to the fluid reservoir associated with the circuit interrupter. Conversely, when the circuit-breaker unit is moved from operating to test positions, the two coupling elements are automatically disconnected, and are such as to prevent the escape of fluid from either the source of arc-extinguishing fluid or the fluid reservoir itself when the couplings are disconnected.

Further, in accordance with another aspect of the invention, the coupling means for the two conduits includes male and female elements, one of which includes a valve which is normally closed when the coupling elements are separated, and the other of which includes an actuating device for opening the valve means in the first-mentioned element when the two are interconnected.

The above and other objects and features of the invention will become apparent from the following detailed description, taken in connection with the accompanying drawings which form a part of this specification, and in which.

Figure 1:
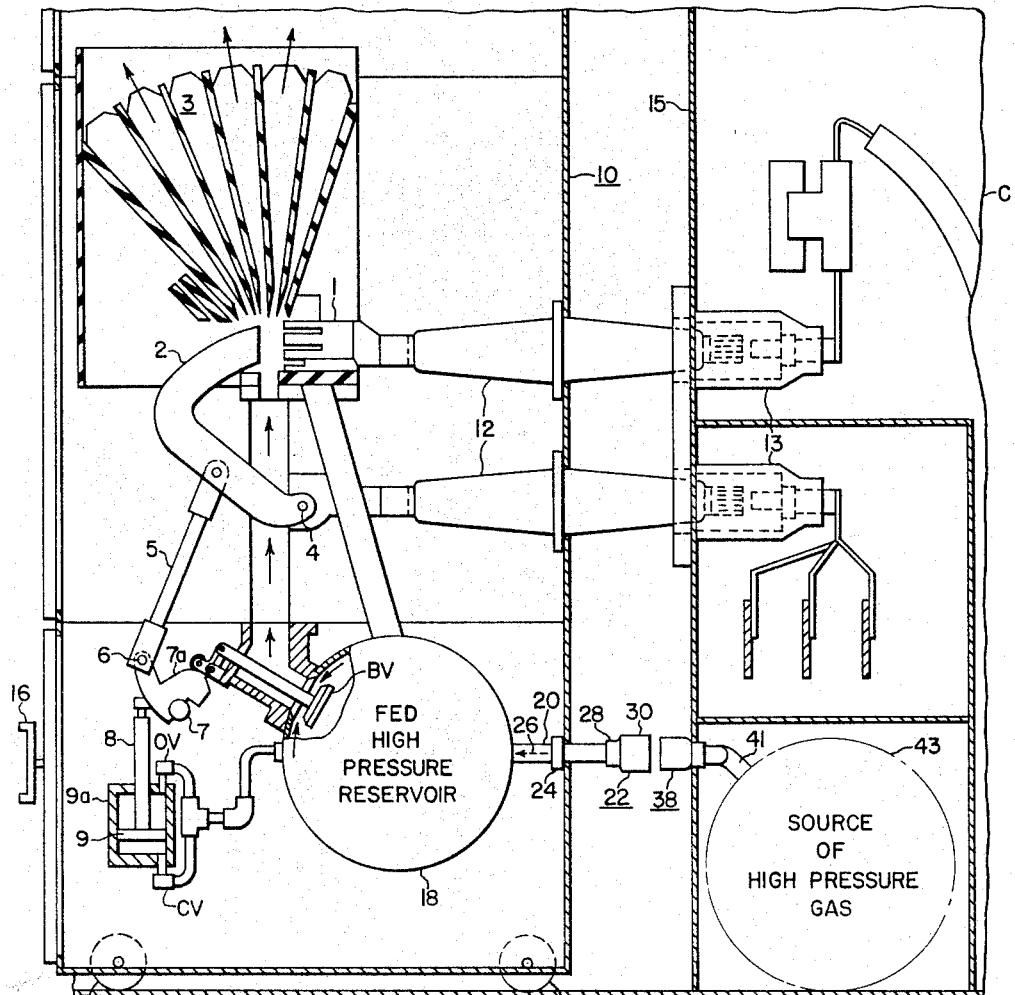
FIGURE 1 is a vertical sectional view of a truck-mounted compressed-gas circuit-breaker unit using the principles of my invention.
Figure 1A:
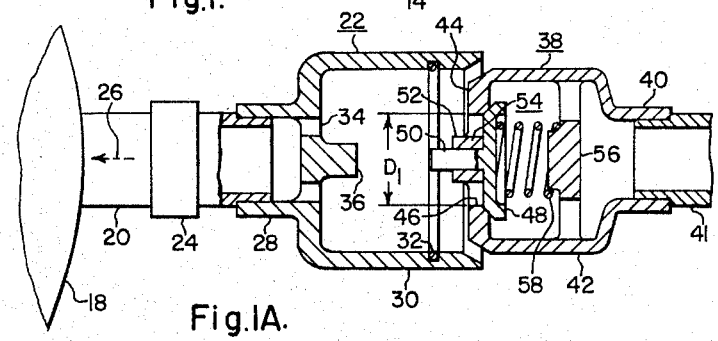
FIGURES 1A, 2 and 3 illustrate one embodiment of the invention in which male and female coupling elements are shown in completely disengaged, partially engaged, and completely engaged positions, respectively.

Referring now to the drawings, and particularly to FIGURES 1, 1A, 2 and 3 thereof, the reference numeral 10 schematically designates the main body of switchgear apparatus, such as a compressed-gas circuit-breaker unit adapted for truck-mounting. Protruding outwardly from the back of the main body 10 are disconnecting terminals 12, which automatically fit into disconnecting contacts 13 of a power circuit within a cell structure 15 when the main body 10 is removed from test to operating positions in the manner hereinafter described. The main body 10 is supported on wheels, schematically illustrated at 14, and may be moved from the position shown in FIGURE 1 to that shown in FIGURE 3, or vice versa, by means of a handcrank 16, or other similar means.

The circuit-breaker unit 10 comprises a pair of separable contacts 1, 2 and splitter-type extinguishing plate structure 3. The movable contact 2 is pivotally mounted, as at 4, and is actuated to the open and closed-circuit positions by an insulating operating rod 5 pivotally connected, as at 6, to a crank-shaft 7. The crank-shaft 7 is pivotally connected to a piston rod 8 having a piston 9 reciprocally operated within an operating cylinder 9a. An opening valve OV and a closing valve CV may be electrically actuated to effect opening and closing movement of the movable contact 2. A blast-valve BV may be cam-actuated by a cam plate 7a secured to, and movable with, the crank-shaft 7. Reference may be made to U.S. Patent No. 2,739,206, issued Mar. 20, 1956, to Fritz E. Florschutz and Raymond H. Leitzel, and assigned to the Westinghouse Electric Corporation, for the general details of the circuit-interrupter and blast-valve operation.

The circuit-interrupter unit 10 is adapted to be moved into and out of a cubicle or cell C. The disconnecting contacts of the circuit-interrupter unit are adapted to coact with cooperable disconnecting contacts of the cell structure C. The circuit-breaker mechanism 10 includes a gas reservoir tank 18 connected through a first conduit 20 to a cup-shaped female coupling element 22. Included in the conduit 20 is a check valve 24, which permits the flow of gas into reservoir 18 along the direction of arrow 26 while preventing the flow of fluid in the reverse sense.

The female coupling element 22 is provided with a reduced-diameter portion 28 which receives one end of the conduit 20, and a communicating, radially outwardly flared portion 30 having a ring seal 32 extending around its inner peripheral surface at the forward end thereof. Carried within the reduced-diameter portion 28 is a spider assembly 34 having integrally formed thereon a centrally axially-extending stem 36.

Adapted to fit into the female coupling element 22 is a male coupling element 38 having a reduced-diameter portion 40 connected to a stationary conduit 41, which, in turn, is connected to a source of arc-extinguishing fluid 43 under pressure, not shown herein. Integral with the reduced-diameter portion 40 is an expanded portion 42 of diameter slightly smaller than the inner peripheral diameter of the flared portion 30 of the female element 22, such that the male element 38 will fit into the female element 22 with the seal 32 preventing the escape of fluid to the atmosphere.

It will be noted that the flared, or expanded portion 42 of the male element 38 is provided with an annular flange 44 extending radially inwardly from its front peripheral edge to define a central valve opening 46 in the front face of the male element 38. Carried within the hollow male coupling element 38 and adapted to seat against the inside edge of the valve opening 46 is a disc-shaped valve element 48. Connected to the valve element 48 is an axially-extending stem 50 which projects through a sleeve 52 formed in a spider assembly 54 within the valve opening 46. At the other end of the expanded portion 42 of the hollow male element 38 is a second spider assembly 56; and between assembly 56 and the valve member 48 is a coil spring 58 which normally urges the member 48 into seating engagement with the inside peripheral edge of valve opening 46.

When the main body 10 of the switchgear apparatus is in its test position, shown in FIG. 1, the two coupling elements 22 and 38 will be disengaged. At this time, the valve member 48 will be forced into engagement with the inner peripheral edge of the valve opening 46 by spring 58 and the gas pressure, thereby preventing the escape of gas from the source of arc-extinguishing fluid under pressure 43 connected to conduit 41. At the same time, compressed gas in the gas reservoir 18 on the main body 10 is prevented from escaping by the check valve 24.

Figure 2:
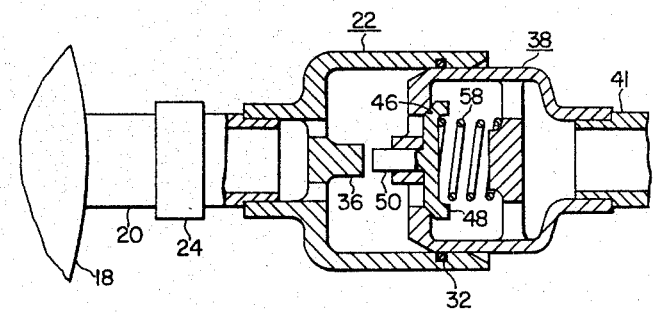

If the crank 16 is rotated so as to drive the main body 10 of the circuit breaker apparatus to the right into the cell structure 15 until the main body 10 of the circuit breaker reaches the position shown in FIG. 2, then the sealing ring 32 is fitted onto the outer periphery of the male coupling element 38 to hermetically seal the two. If the main body 10 of the circuit-breaker apparatus is further driven into its operating position within the cell 15, shown in FIG. 3, wherein terminals 12 are connected to the main circuit, then the stem 36 in the female element 22 engages the stem 50 on valve member 48 to thereby force the valve member away from its seat and permit compressed gas from conduit 41 to flow through opening 46 and check valve 24 into the gas reservoir 18. When, however, the crank 16 is rotated so as to move the main body 10 of the circuit breaker apparatus from its operating position shown in FIG. 3 to the left, then the stem 36 of female coupling element 22 will be withdrawn from stem 50; whereupon the coil spring 58 and the gas pressure will combine to automatically force the valve member 48 into engagement with its seat 46 to again prevent the escape of fluid under pressure from conduit 41. At the same time, the check valve 24 will prevent the escape of fluid from reservoir 18 with the overall result that the only gas escaping is that residual amount within the female coupling element 22.

Figure 3:
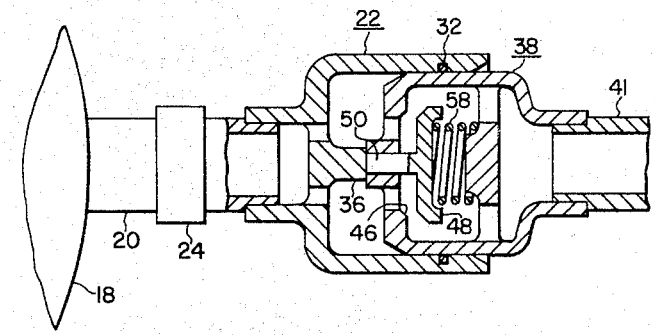
Figure 4:
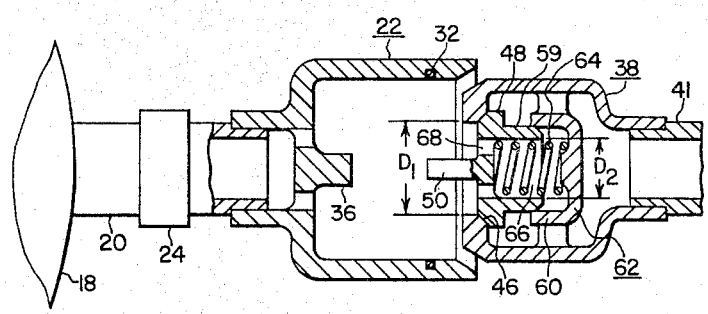
FIGURES 4, 5 and 6 illustrate another embodiment of the invention in which male and female coupling elements are again respectively completely disengaged, partly engaged, and fully engaged; and, FIGURES 7, 8 and 9 illustrate still another embodiment of the invention in which the positions of the male and female coupling elements are the same as those in connection with FIGURES 1A-3 above.
Figure 5:
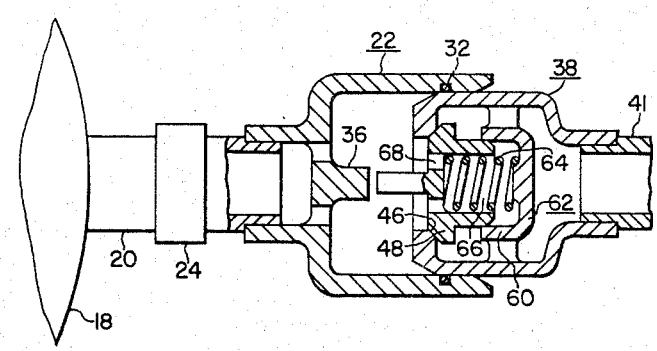
Figure 6:
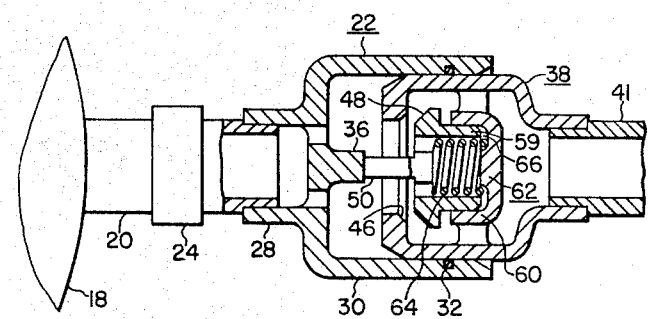

Another embodiment of the invention is shown in FIGS. 4, 5 and 6 wherein elements corresponding to those shown in FIGS. 1–3 are identified by like reference numerals. In this case, however, means are provided for reducing the driving force necessary to open, or unseat the valve member 48. In this respect, it will be noted that the valve member 48 has an integral skirt extension 59, which fits into a corresponding cup-shaped member 60 carried on a spider assembly 62. Coil spring 64 is interposed between the members 60 and 48 for the purpose of urging the valve member 48 against the inner peripheral surface of valve opening 46.

It will be noted that the two members 48 and 60 define a variable volume chamber 66 having a maximum inner peripheral diameter equal to $D_2$. Formed in the valve member 48 are openings 68 which normally communicate with the atmosphere when the elements 22 and 38 are separated, but which will admit fluid under pressure into the variable volume chamber 66 when the two couplings are in engagement as shown in FIG. 6. Assuming that the valve opening 46 has a diameter $D_1$, the closing force F exerted by the gas in conduit 41 against the valve member 48 tending to move it to the left, as viewed in FIGS. 4–6, or to maintain the valve 48 closed, is $F = \pi/4(D_1^2 - D_2^2) \cdot P$ where P represents the difference in pressure between that in conduit 41 and atmospheric pressure. This closing force F, of course, is much less than it would be in the case where the variable volume chamber 66, or communicating space to the atmosphere, is not provided, as in FIGS. 1–3, and the closing force F exerted on valve 48 is $F = \pi/4 D_1^2 \times P$ where $D_1$ corresponds to the dimension $D_1$ of valve member 48, as shown in FIG. 4. As a result, the opening force required in FIGS. 4–6, to open the valve 48 is considerably reduced.

Figure 7:
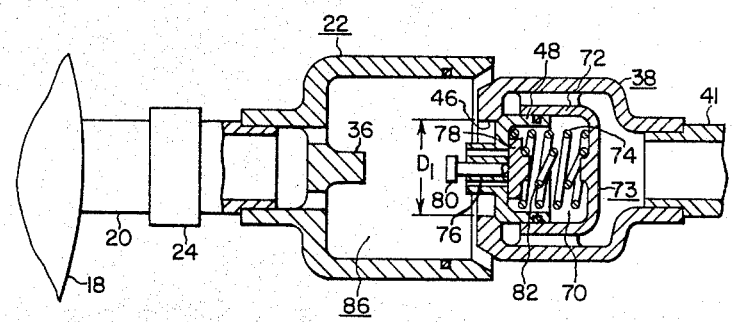
Figure 8:
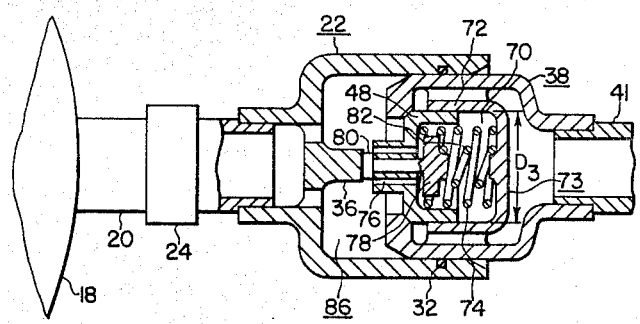
Figure 9:
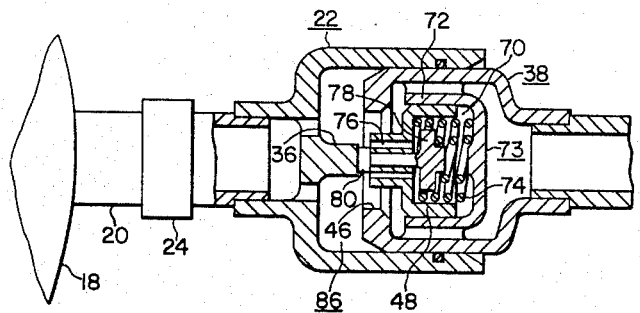

With reference now to FIGS. 7, 8 and 9, still another embodiment of the invention is shown where, again, elements corresponding to those shown in FIGS. 1, 2 and 3 are identified by like reference numerals. Here, again, a variable volume chamber 70 is provided and comprises a cup-shaped valve 48 and a second cup-shaped member 72 supported on spider assembly 73, with a coil spring 74 being interposed between the members to urge them apart. However, instead of having openings 68 in the valve member 48 as in FIGS. 4–6 wherein the openings are always unobstructed, openings 76 are provided, which are normally closed by means of a pilot valve 78 having a plunger 80 which extends through stem 50. The pilot valve 78, in turn, is urged into closing position by means of a second coil spring 82 carried within the first spring 74. The diameter $D_3$ is, of course, as large as possible, compared with the diameter $D_1$ of the valve opening 46, for the purpose of maximizing the differential surface area of valve member 48 subjected to pressure from conduit 41.

In the operation of the embodiment of FIGS. 7–9, the stem 36 on the female element 22 will initially engage the plunger 80, thereby moving the valve element 78 away from its seat and permitting compressed gas within the variable volume chamber 70, which was previously entrapped therein, to escape. The gas is entrapped within chamber 70 by virtue of the fact that the pilot valve 78 will close before the coupling elements 22 and 38 completely separate during a disconnecting operation. Upon the subsequent connecting operation, the stem 36 contacts plunger 80 first, thereby opening pilot valve 78, as shown in FIG. 8 and permitting the entrapped gas to flow into the area 86. This creates a gas energizing force of $$\pi/4(D_3{}^2 - D_1{}^2)P'$$

where P' is a differential pressure tending to drive the valve member 48 against the force of spring 74 and into its open state shown in FIG. 9.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In switchgear apparatus, in combination, a truck-mounted circuit breaker unit movable between operating and test positions within a cubicle structure, said circuit breaker unit including a gas reservoir chamber, means for supplying an arc-extinguishing fluid under pressure to said gas reservoir chamber including a first conduit connected to said chamber and having a coupling element on one end thereof, said first conduit and its associated coupling element being movable with said circuit breaker unit between operating and test positions within said cubicle structure, and said cubicle structure having a second conduit associated therewith having a coupling element on one end thereof and adapted for connection to a source of arc-extinguishing fluid under pressure, said second conduit and the coupling element carried thereby being stationary and so positioned as to automatically engage the coupling element on said first conduit when the circuit breaker unit is moved from test to operating positions without manual alignment, whereby fluid may flow from said source of fluid under pressure to said reservoir chamber on the unit when the circuit breaker unit is in operating position within the cubicle structure.

2. In switchgear apparatus, the combination of a truck-mounted circuit breaker movable between operating and test positions within a cubicle structure, said circuit breaker including a storage tank, means for supplying an arc-extinguishing fluid under pressure to the storage tank and including a conduit having a male coupling element on one end thereof, a conduit having a female coupling element on one end thereof and adapted to receive the male element, one of said conduits being connected to said circuit breaker and movable therewith, the other of said conduits being stationary and adapted for connection to a source of arc-extinguishing fluid under pressure, means for registering the two coupling elements so that automatic aligned engagement will occur when the truck-mounted circuit breaker is moved to the operating position within the cubicle structure, normally-closed valve means in the coupling element on said other conduit and arranged to prevent the escape of fluid from said other conduit when the coupling elements are separated, and means in the coupling element on said one conduit for opening said normally-closed valve means when the male coupling element is inserted into the female element to permit fluid to flow from said source of arc-extinguishing fluid under pressure through said couplings and into said storage tank.

3. In switchgear apparatus, the combination of a truck-mounted circuit breaker movable between operating and test positions within a cubicle structure, said circuit breaker including a storage tank, means for supplying an arc-extinguishing fluid under pressure to the tank and including a conduit having a male coupling element on one end thereof, a conduit having a female coupling element on one end thereof and adapted to receive the male element, one of said conduits being connected to said circuit breaker and movable therewith, the other of said conduits being stationary and adapted for connection to a source of arc-extinguishing fluid under pressure, means for registering the two coupling elements so that automatic aligned engagement will occur when the truck-mounted circuit breaker is moved to the operating position within the cubicle structure check-valve means in said one conduit permitting the passage of fluid into the storage tank while preventing the escape of fluid therefrom, normally-closed valve means in the coupling element on said other conduit and arranged to prevent the escape flow from said source of arc-extinguishing gas under pressure through said couplings and said check valve means into said compressed-gas storage tank.

4. In switchgear apparatus, the combination of a truck-mounted circuit breaker movable between operating and test positions within a cubicle structure, said circuit interrupter including a compressed-gas storage tank, means for supplying an arc-extinguishing gas under pressure to said compressed-gas storage tank including a first conduit connected to said tank and having a female coupling element on one end thereof, said first conduit and the female coupling element carried thereby being movable with said circuit breaker between operating and test positions, a second stationary conduit adapted for connection to a source of arc-extinguishing fluid under pressure and having a male coupling element on one end thereof adapted to fit into the female element on said first conduit when the circuit breaker is moved from a test to an operating position, means for registering the two coupling elements so that automatic aligned engagement will occur when the truck-mounted circuit breaker is moved to the operating position within the cubicle structure, check-valve means in said first conduit permitting the passage of fluid into said compressed-gas storage tank while preventing the flow of fluid therefrom, normally-closed valve means in the male coupling element, said valve means including a valve seat, a valve member and spring means for urging the valve member into seating engagement with said valve seat, an axially-extending stem connected to said valve member and projecting through the valve opening defined by said valve seat, and an axially-extending stem within the interior of said female coupling element adapted to engage said first-mentioned stem and apply an axial force thereto to unseat said valve member when the female coupling element is inserted over the male coupling element, the arrangement being such that when the coupling elements are in coupling engagement, the stem device on the female element will engage the stem device on the male element to unseat the valve member against the force of said spring means to permit gas to opening beyond the front face of the male element and of such length to engage the stem in the female element when the circuit breaker is moved from test to operating positions and the male element is insered into the female element, the arrangement being such that when the circuit breaker is in operating position and the male element inserted into the female element, the stem on the female element will engage that on the male element to move the valve member away from the inside edge of the valve opening in the male element to permit compressed gas to flow from said source of arc-extinguishing gas under pressure and through the coupling elements into said compressed-gas storage reservoir.

5. In switchgear apapratus, in combination, a truck-mounted circuit breaker movable between operating and test positions within a cubicle structure, said circuit breaker including a compressed-gas storage reservoir, means for supplying an arc-extinguishing gas under pressure to said compressed-gas storage reservoir and including a first conduit connected to said reservoir and having a female coupling element on one end thereof, said first conduit and the female coupling element carried thereby being movable with said circuit breaker between operating and test positions within said cubicle structure, a second stationary conduit adapted for connection to a source of arc-extinguishing fluid under pressure and having a male coupling element on one end thereof adapted to fit into said female coupling element, means for registering the two coupling elements so that automatic aligned engagement will occur when the truck-mounted circuit breaker is moved to the operating position within the cubicle structure, said female coupling element being generally cup-shaped and having a spider assembly therein which supports an axially-extending stem, said male element being hollow and adapted to slide snugly into said cup-shaped female element, an annular flange extending radially inwardly from the front peripheral edge of said male element to define a central valve opening in the front face of the male element, a valve member carried within the hollow male element and adapted to seat against the inside edge of said central valve opening, spring means carried within the hollow male element for urging the valve member against said inside edge of the valve opening, and an axial stem on the valve member extending through said valve of fluid therefrom when the coupling elements are separated, and means in the coupling element on said one conduit for opening said normally-closed valve means when the male coupling element is inserted into the female element to permit fluid to flow from said source of arc-extinguishing fluid under pressure through said couplings and the check valve means into said storage tank.

6. The combination of claim 5 wherein said valve member comprises a part of a chamber (66) closed off from the fluid pressure in the second stationary conduit and open to the space between the coupling elements when they are engaged, and spring means in the chamber urging said valve member against the inside edge of said valve opening.

7. In combination, a switchgear cell having a source of fluid under pressure associated therewith, a stationary fluid-conduit means connected to said source and at least one pair of disconnecting contacts associated with the switchgear cell, a circuit-breaker unit including a movable frame movable into and out of said switchgear cell to test and operating positions, the movable frame of the circuit-breaker unit carrying a fluid reservoir chamber therewith, movable cooperable conduit means movable with said frame and adapted for automatic registration with the first said conduit means upon movement of the circuit-breaker unit into operating position, and said last-mentioned movable cooperable conduit means being connected to the movable fluid reservoir chamber.

8. The combination according to claim 7, wherein the first said conduit means has normally-closed valve means to prevent exhausting of fluid from said source upon disengagement of the two conduit means.

References Cited by the Examiner

UNITED STATES PATENTS 2,761,469   9/1956   Hansen _____ 137—614.05

FOREIGN PATENTS 78,726   7/1962   France.
541,842   12/1941   Great Britain.

ROBERT K. SCHAEFER, *Primary Examiner.*

KATHLEEN H. CLAFFY, *Examiner.*

P. E. CRAWFORD, *Assistant Examiner.*